United States Patent [19]
Elrod

[11] Patent Number: 4,571,355
[45] Date of Patent: Feb. 18, 1986

[54] FIBER REINFORCED RESIN COMPOSITES FORMED OF BASIC PLY BLANKETS

[75] Inventor: Samuel D. Elrod, Seattle, Wash.

[73] Assignee: The Boeing Company, Seattle, Wash.

[21] Appl. No.: 675,746

[22] Filed: Nov. 28, 1984

[51] Int. Cl.⁴ .............................................. B32B 3/06
[52] U.S. Cl. .................................... 428/102; 428/103; 428/104; 428/107; 428/111; 428/113; 428/114; 428/238; 428/239; 428/246; 428/284; 428/296; 428/298; 428/302; 428/408; 428/902
[58] Field of Search ............... 428/102, 103, 104, 107, 428/111, 113, 114, 238, 239, 246, 284, 296, 298, 302, 408, 902

[56] References Cited

U.S. PATENT DOCUMENTS

| | | | |
|---|---|---|---|
| 3,573,123 | 3/1971 | Siegel et al. | 156/171 |
| 3,637,446 | 1/1972 | Elliott et al. | 156/69 |
| 3,768,760 | 10/1973 | Jensen | 244/123 |
| 3,930,916 | 1/1976 | Shelley | 157/71 |
| 3,946,127 | 3/1976 | Eisenmann et al. | 428/48 |
| 4,051,289 | 9/1977 | Adamson | 428/113 |
| 4,331,495 | 5/1982 | Lackman et al. | 156/93 |
| 4,331,723 | 5/1982 | Hamm | 428/61 |
| 4,368,234 | 1/1983 | Palmer et al. | 428/245 |
| 4,395,450 | 7/1983 | Whitener | 428/116 |
| 4,413,860 | 11/1983 | Prescott | 301/63 |

Primary Examiner—Marion C. McCamish
Attorney, Agent, or Firm—Christensen, O'Connor, Johnson & Kindness

[57] ABSTRACT

Fiber reinforced resin composites formed of basic ply blankets is disclosed. The method of the invention uses design criteria, namely fiber orientation and fiber percentages in each orientation direction, to create a basic ply blanket having the same fiber orientation and percentage relationship. Specifically, a basic ply blanket comprises a plurality of plies, one in each fiber orientation direction. The fiber magnitude proportion that each blanket ply bears to the fiber magnitude of the blanket is based on the design criteria fiber proportion. The thickness of the basic ply blanket is divided into the design thickness at various locations and the results used to determine the number of blankets needed to meet the thickness requirement of the fiber reinforced resin composite at such locations. Basic ply blankets are then stacked to create the required thickness.

56 Claims, 11 Drawing Figures

PRIOR ART Fig. 1.

| POSITION | THICKNESS | NO. OF BASIC PLY BLANKETS | |
|---|---|---|---|
| | | BASED ON 3/12K TOWS PER. FT. | BASED ON 1/6K TOWS PER. FT. |
| A | .051 | 2 | 4 |
| B | .149 | 6 | 12 |
| C | .223 | 9 | 18 |
| D | .244 | 10 | 19 |
| E | .244 | 10 | 19 |
| F | .250 | 10 | 20 |
| G | .250 | 10 | 20 |
| H | .250 | 10 | 20 |
| I | .239 | 10 | 19 |
| J | .692 | 28 | 55 |
| K | .372 | 15 | 30 |
| L | .227 | 9 | 18 |
| M | .160 | 6 | 13 |

FIBER REINFORCED RESIN COMPOSITES FORMED OF BASIC PLY BLANKETS

TECHNICAL AREA

This invention relates to fiber reinforced resin composites and, more particularly, to fiber reinforced resin composites formed of a plurality of unidirectional fiber plies having a variety of directional orientations.

BACKGROUND OF THE INVENTION

In recent years the use of high strength-to-weight ratio fiber reinforced resin composites has continuously expanded, particularly in weight sensitive products such as aircraft and space vehicles. In the past, fiber reinforced resin composites used in such products were usually created by "laying-up" a plurality of unidirectional plies using tapes having a prescribed fiber areal weight preimpregnated with resin. (Areal weight is weight per unit area, i.e., grams per square meter.) The ply direction and number of plies included in such lay-ups is based on the ultimate use of the resultant composite. In most instances a main ply direction (commonly referred to as the 0° ply direction) is first chosen based on some criteria, such as the direction of the major force to be applied to the composite. After the main or 0° ply direction is chosen, the direction of other plies are chosen based on the forces and loads to be applied to the resulting composite. The most common directions are: orthogonal to the main direction (commonly referred to as the 90° direction); and equally intermediate the main and orthogonal directions (commonly referred to as the +45° and −45° or + and − directions). In addition to determining ply direction, the percent of fiber orientation in each direction was determined based on expected load force. For example, a prescribed fiber orientation for an aircraft wing might be: 6% in the 0° direction; 44% in the +45° direction; 44% in the −45° direction; and 6% in the 90° direction. After the foregoing choices have been made, the layup is created using tape of a chosen grade having a prescribed number of filaments per tow.

The major disadvantage of the foregoing process is that it requires that undesirable design compromises be made. Specifically, the tapes used to make prior layups have a prescribed fiber areal weight and, thus, a prescribed thickness. In many instances, the fiber areal weight is such that more than that required to meet the design criteria of a particular ply direction is provided by a particular tape. While this result can be limited in some situations by changing to a grade of tape having a lower fiber areal weight, this approach does not fully solve the problem since tape grades are fixed. Thus, if only one ply in a particular fiber orientation direction is required often it must contain more than the design number of fibers since it is unusual for design criteria and tape sizes to match in the area of fiber areal weight. A similar situation exists when tape fiber areal weight is not a whole number multiple of the design fiber areal weight in a particular fiber direction. In such instances, in the past, more fiber tape than necessary has been used since a whole ply was included to achieve the strength required of the last (partial) ply. Hence, the end result of past techniques for creating fiber reinforced resin composites is composites that are thicker and, thus, heavier than necessary.

Another disadvantage, particularly in instances where only a single ply is needed in a particular direction, is fiber concentration. Fiber concentration in a single layer, as opposed to spreading fibers through several layers, has the disadvantage of creating a higher probability shear plane, i.e., a plane along which shear is more likely to occur.

SUMMARY OF THE INVENTION

In accordance with this invention, a method of creating fiber reinforced resin composites formed of basic ply blankets and the composites resulting from the method are provided. The method is based on the design thickness and the percent directional fiber orientation of the fiber reinforced resin composite to be produced. Both of these design criteria are determined by the use to which the resultant resin composite is to be put. Standard techniques, which do not form part of this invention, are used to determine these criteria.

In accordance with the method of this invention, the percent fiber orientation design criteria is used to determine the filament magnitude of a ply in each fiber orientation direction. Plies with the prescribed magnitude of fiber orientation are combined to create a basic ply blanket. The thickness of a thusly formed basic ply blanket is used to determine the number of blankets needed to meet the thickness requirement of the fiber reinforced resin composite being produced, which may vary from region to region. The determined number of blankets are then stacked to create the required thickness.

In accordance with further aspects of this invention, the plies used to form the basic ply blankets may be combined in various manners. In one form, tows used to form one or more plies are held together by a transverse basting stitch, such as a weft insertion knitting stitch, for example. In addition, if desired, as they are being layered (or after being layered), the plies are joined by stitching them together in the cross-blanket or Z-direction. Alternatively, the plies may be combined by weaving together the tows used to form the plies. For example, the tows that form the 0° and 90° plies may be woven into one layer and the tows that form the +45° and −45° plies may be woven into another layer. The resulting woven layers are then stacked to create the basic ply blanket. If desired, the woven layers can be joined by cross-blanket (i.e., Z-direction) stitching. Alternatively, the tows that form plies lying in three directions (e.g., 90°, +45° and −45°) can be woven together and stacked with a fourth ply running in another (e.g., 0°) direction. Or the tows in all directions can be woven together to form the entire basic ply blanket.

While the plies that are combined to form the basic ply blankets may be preimpregnated with the resin prior to being layered, preferably, the plies are dry. Further, while the basic ply blankets can be impregnated with resin prior to being stacked, preferably a resin layer(s) is (are) added as, or after, the ply stack is formed and the resultant layup cured in the manner described in U.S. Patent Application Ser. No. 676,427, pending filed Nov. 29, 1984, entitled RESIN FILM INFUSION PROCESS by Leslie E. Letterman and assigned to the assignee of the present application.

As will be readily appreciated from the foregoing description, the invention avoids the disadvantages of prior art methods of creating fiber reinforced resin composites and the disadvantages of composites formed by such methods. More specifically, because fiber magnitude in each ply direction is based on design criteria, rather than standardized ply criteria, the inclusion of unnecessary excess fiber plies in the resultant fiber reinforced resin composite is substantially reduced if not entirely avoided. As a result, minimum weight composites having the desired directional strength are produced by practicing the process of the invention. Moreover, the stacking of basic ply blankets to create required thicknesses results in spreading the fibers in each ply direction throughout the resultant composite. This arrangement minimizes fiber concentration and, thus, cleavage plane separation.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
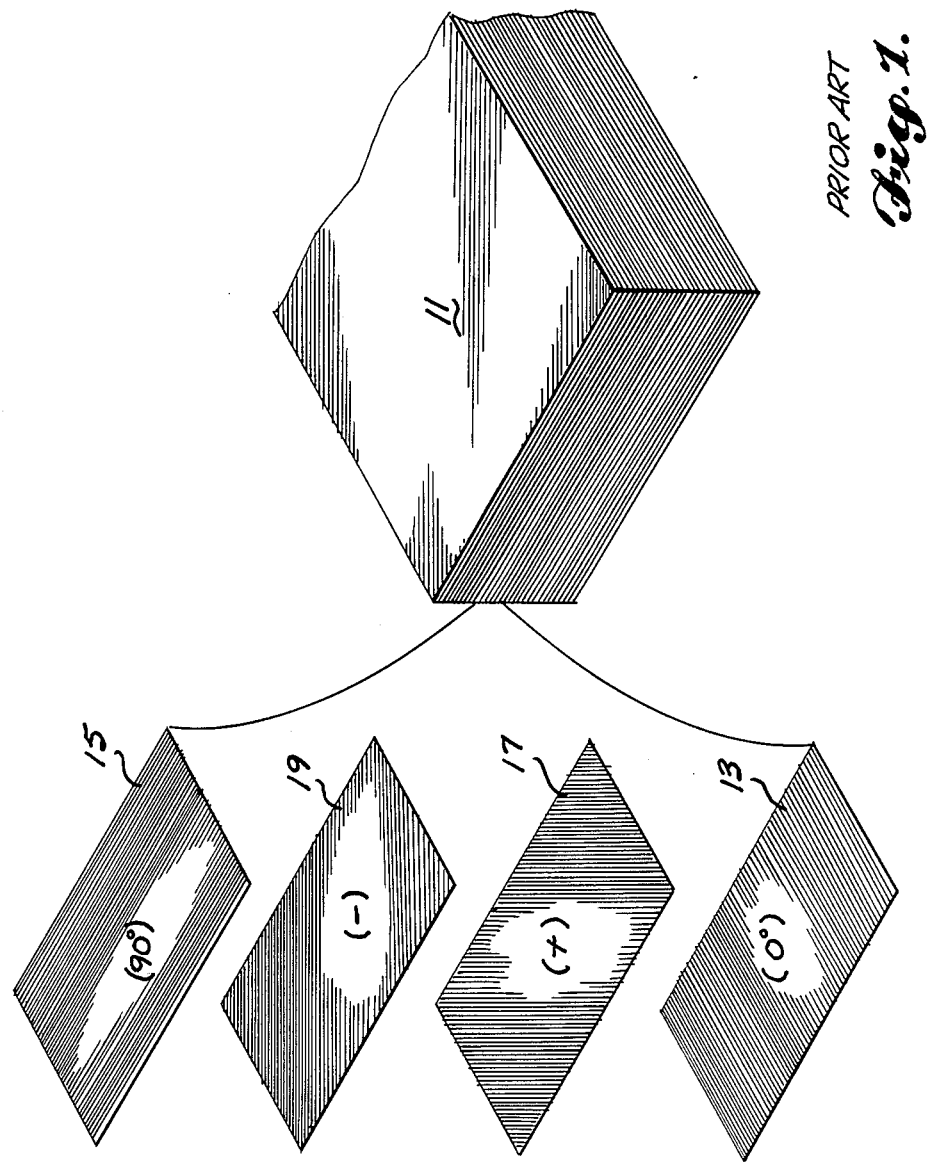
FIG. 1 is a pictorial diagram illustrating a prior art layup.

Because the advantages and features of the invention are best understood when the invention is compared to the way fiber reinforced resin composites have been created in the past, a brief discussion of the most common prior method of creating fiber reinforced resin composites is first described. As illustrated in FIG. 1, in the past, fiber reinforced resin composites have been formed by creating a layup 11 from a plurality of layers or plies 13, 15, 17 and 19. The plies are formed of fiber tows laid parallel to one another. Since tows are loose untwisted strands of essentially parallel fibers, the plies 13, 15, 17 and 19 have a fiber orientation that is based on the longitudinal directional orientation of the tows.

The layup 11 is created by stacking a plurality of plies such that they have different fiber orientations based on the strength requirements of the fiber reinforced resin composite being created, i.e., that have different orientations based on design criteria. Normally, plies in a chosen direction are first designated. Such plies are normally defined as the main or 0° plies 13. Other plies are positioned such that their fibers lie orthogonal to the fiber direction of the 0° plies. These plies are commonly referred to as 90° plies 15. Other plies are oriented such that their fibers lie at some angle between the 0° and 90° plies. The normal angle is 45°; however, other angles can be utilized. Hence, the intermediate plies are normally defined as +45° or −45° (or sometimes simply as + and −) plies. Rather than being formed of single sheets as shown in FIG. 1 for ease of understanding, normally the plies 13, 15, 17 and 19 are formed of pieces of relatively wide (e.g., 3 inch) tape laid side by side. The tape is formed of parallel tows each formed of a substantially equal number of fiber filaments. While tow size varies, the variations have fixed values such as 1K filament tows, 3K filament tows, 6K filament tows and 12K filament tows. The fiber tows of such tapes are usually preimpregnated with a suitable uncured resin. The stickiness of the resin holds the tows together.

Figure 11:
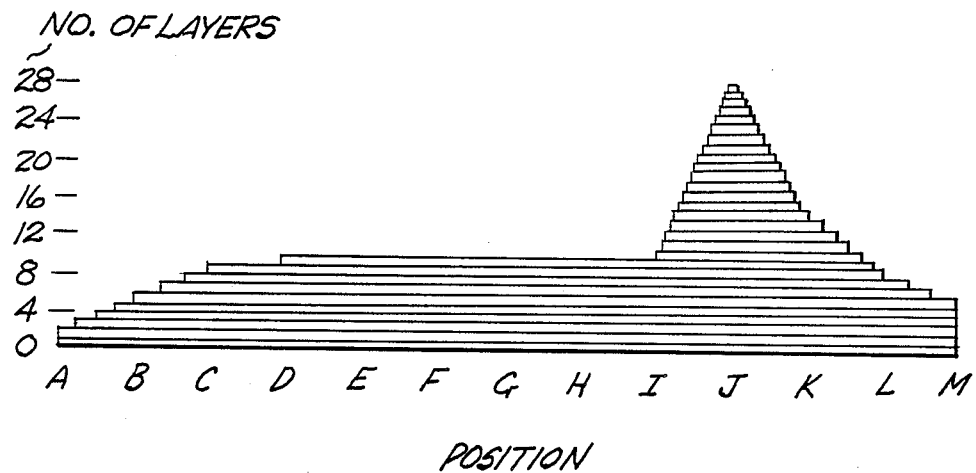

After a layup of the type illustrated in FIG. 11 has been created, it is cured in an autoclave that applies heat and pressure to the layup. The heat causes the resin to cure. The pressure removes trapped gases from the layup 11, including air and volatiles, generated during curing. While, as noted above, tow size varies, the cross-sectional number of fibers per dimension, i.e., total fiber areal weight remains constant for each grade of tape. Thus, the thickness of each grade of tape remains constant. For example, Grade 145 (145 grams per square meter), AS-6 carbon fiber tape formed of 12K tows has 84.7 tows per foot. When formed of 6K tows, Grade 145 AS-6 carbon fiber tape has twice as many tows per foot; when formed of 3K tows AS-6 Grade 145 has four times as many tows per foot; and when formed of 1K tows, Grade 145 AS-6 carbon fiber tape has twelve times as many tows per foot. Since filament areal weight, i.e., the number of filaments per inch in any cross-sectional direction is constant for each grade of tape, (84.7K filaments per inch in the case of Grade 145, AS-6 carbon fiber) the cured thickness—0.00565 inch for Grade 145—is the same for each grade of tape regardless of the size of the tows used to form the tape. This factor is important to the following description of one way of implementing the present invention, as discussed more fully below.

As is understood by those skilled in the creation of fiber reinforced resin composites and will be appreciated by others from the foregoing discussion, the nature and use of a fiber reinforced resin composite dictates fiber orientation, i.e., the number of fibers running in each direction, and, thus, ply orientation. A wing skin of the type illustrated in FIG. 7 and hereinafter described may have a fiber orientation of 6% 0° fiber, 44% +45° fiber, 44% −45° fiber and 6% 90° fiber. An assumed (for example) wing thickness of 0.051 inch at some particular wing location means that nine layers of Grade 145 AS-6 carbon fiber tape (0.051 0.00565=9 plies) are required to form the wing at the chosen location. This means that less than one 0° and one 90° ply are required (6%×9=0.54 plies). In order to meet this requirement utilizing Grade 145 AS-6 carbon fiber tape, one ply must be used even though only approximately one half (½) of its strength is needed. As a result, under these conditions, the resulting composite will have nearly twice the required weight of tape in the 0° and 90° ply direction if Grade 145 AS-6 tape is used. While it is possible to use a lower grade ply, the cost of lower grade tapes is significantly higher than the cost of standard grade tapes, such as Grade 145 AS-6 tape. Moreover, and more importantly, there are grade limits. To date, grades below 90 have not been successfully produced.

As will be readily appreciated, the same problem exists when more than one, but a noninteger number of plies in any particular direction are needed. Using the nine (9) ply example set forth above, while close, the +45° and −45° directions require a noninteger number of plies (44% ×9=3.96). Other examples will have much worse values, e.g., 3.09 plies. In such cases, plies to the next interger level must be used if the amount of fiber determined by the design criteria is to exist in the relevant direction of the resultant fiber reinforced resin composite. The unnecessary added part of a ply again creates unnecessary weight. In the most extreme case a four (4) direction composite (i.e., a 0°, 90°, +45° and −45° composite) could have close to four (4) additional plies. If such a composite has a nine (9) ply design criteria based solely on thickness, the unnecessary weight and thickness would approach fifty percent (50%) of the design weight and thickness. Such an increase is unacceptable in structures where weight is critical—aircraft, for example.

In summary, the constraints created by the prior art have resulted in monolithic structures that are thicker and, thus, heavier than needed to meet design criteria in many situations. As described more fully below, the present invention avoids this disadvantage by creating basic ply blankets that can be stacked to create a layup in which the magnitude of fibers lying in each fiber orientation direction is substantially equal to the magnitude specified by the design criteria.

Figure 2:
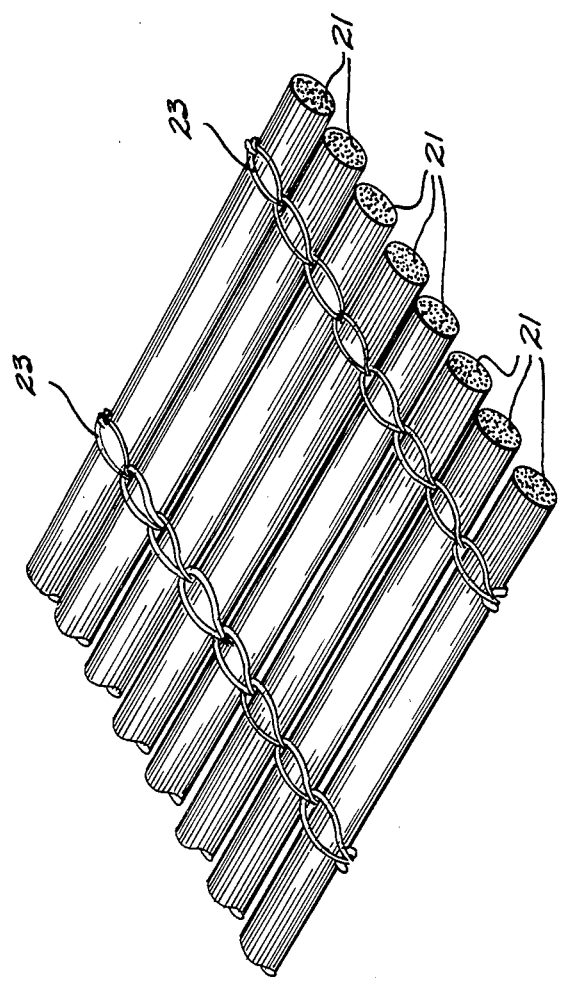
FIG. 2 is a pictorial diagram illustrating a fiber ply formed of a plurality of parallel tows held in alignment by transverse basting stitches.

As illustrated in FIG. 2, in accordance with the invention, at least some of the plies used to form a basic ply blanket may be formed of unidirectional tows 21 held together by a basting stitch—a weft insertion knitting stitch 23, for example—lying orthogonal to the axis of the tows 21. Alternatively, the tows could be joined by orthogonally arrayed sticky strips, i.e., threads or string coated with a sticky adhesive. As will be better understood from the following description, after one or more of the unidirectional tow plies is stitched, the plies are stacked and, preferably, stitched together.

Figure 3:
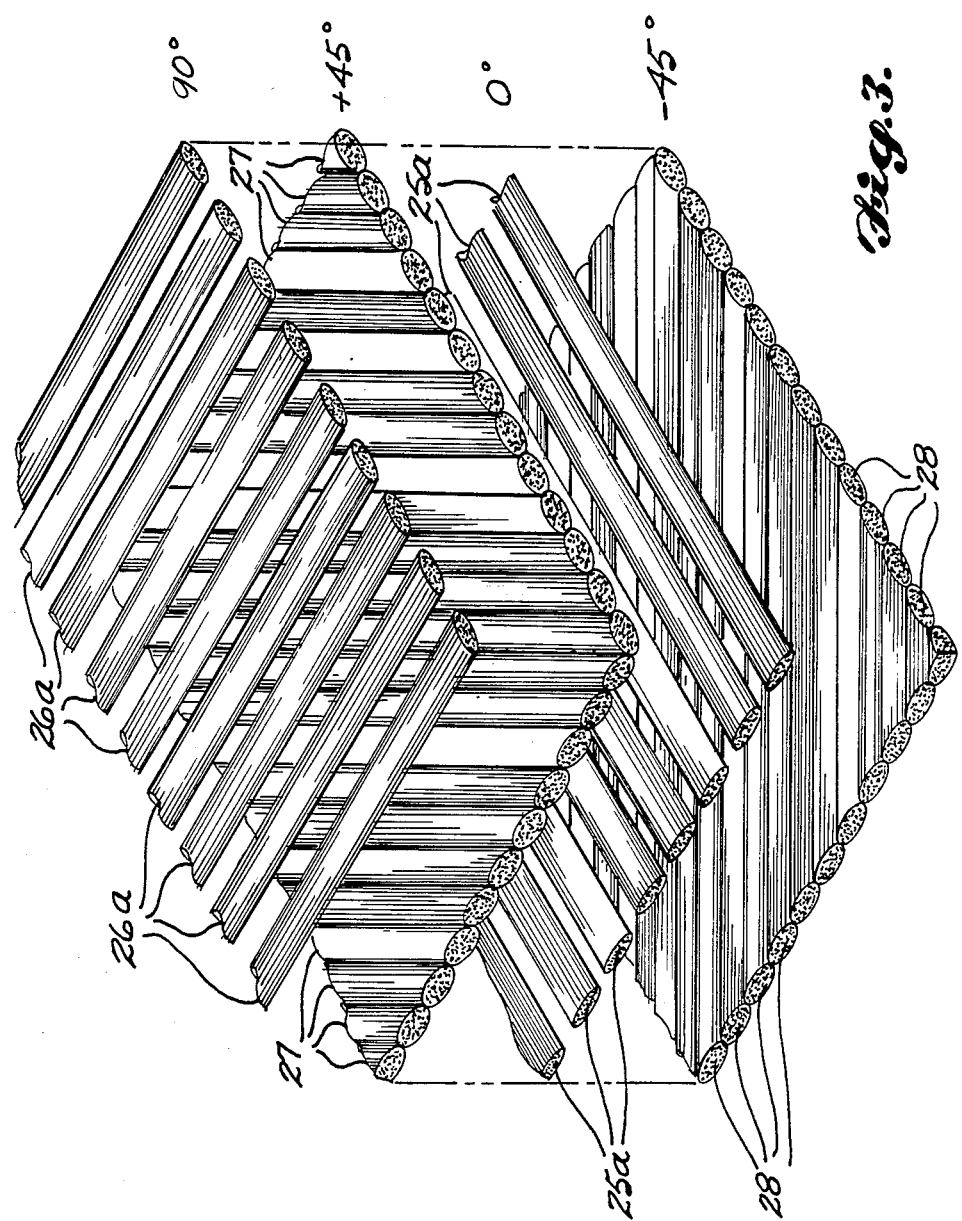
FIG. 3 is a pictorial diagram illustrating one way of forming an unwoven basic ply blanket in accordance with the invention.
Figure 4:
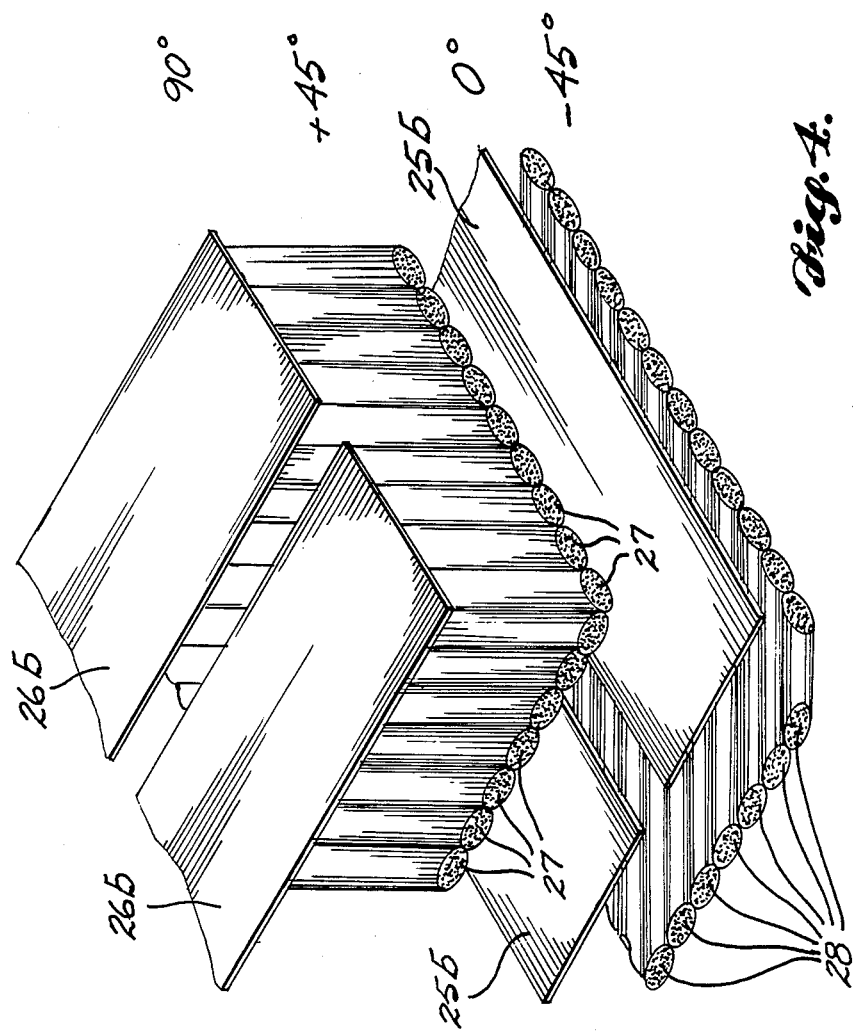
FIG. 4 is a pictorial diagram illustrating the same way of forming an unwoven basic ply blanket illustrated in FIG. 3, using different sized tows.

FIGS. 3 and 4 illustrate two different ways of forming unwoven basic ply blankets, i.e., ways of forming basic ply blankets using unidirectional tow plies. Preferably, the tows are stitched or held together in some manner, as described in the preceding paragraph and illustrated in FIG. 2. In FIGS. 3 and 4, the lower ply is a −45° ply, the next ply is a 0° ply, the next ply is a +45° ply and the top ply is a 90° ply. The 0° and 90° plies have substantially less tows 25a, b and 26a, b than the + and −45° plies 27 and 28 due to a presumed design requirement for a substantially lower percentage of fibers in the 0° and 90° directions. The 0° and 90° ply requirement could be the 6% value of the foregoing example and the + and −45° ply requirement could be the 44% value, for example. The major difference between FIGS. 3 and 4 is that the number of tows 25a and 26a forming the 0° and 90° plies in FIG. 3 is substantially greater than the number of tows 25b and 26b forming the 0° and 90° plies in FIG. 4. While the number of tows is less, the number of fiber filaments in each 0° and 90° ply tow of FIG. 4 is substantially greater than the number of fiber filaments in each 0° and 90° ply tow of FIG. 3, i.e., the tow sizes are different. The end result of this arrangement is that the total number of filament fibers, i.e., fiber areal weight, is the same. By way of example, the FIG. 3 0° and 90° plies could be formed of flattened 3K tows and the FIG. 4 0° and 90° plies formed of flattened 12K tows with the number of tows per inch in FIG. 4 being one fourth (¼) the number of tows per inch in FIG. 3. As noted, in both figures, the tows in the 0° and 90° directions are shown as somewhat flattened with the width-to-thickness ratio of the tows 25b and 26b in FIG. 4 being substantially greater than the width-to-thickness ratio of the tows 25a and 26a in FIG. 3 due to the different sized tows being used. The flatness is such that the thickness of the 0° and 90° plies in both FIGURES is substantially the same.

The tows of each of the plies illustrated in FIGS. 3 and 4 can be joined by basting stitches, as illustrated in FIG. 2, for example, or some of the plies can be stitched, and other plies added as unjoined tows. Stitched together 45° plies may be created by first stitching the tows together using a suitable orthogonally oriented stitch, such as a weft insertion knitting stitch, for example. After the stitches are applied, such plies are skewed to reorient the fibers at the desired 45° angle.

Figures 5, 10:
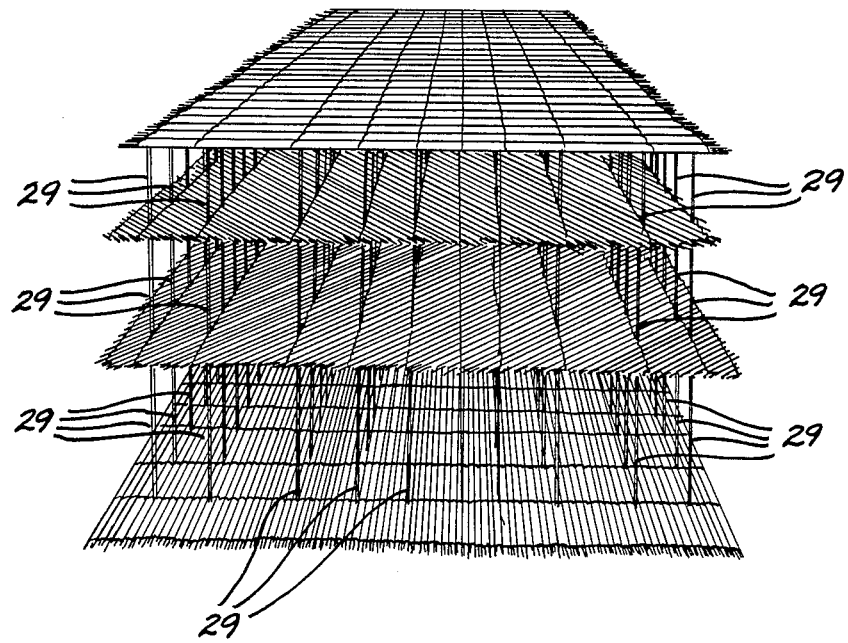
FIG. 5 is a pictorial diagram illustrating Z-direction or crossstitching of basic ply blankets of the type shown in FIGS. 3 and 4.
FIG. 10 is a table relating the wing cross-sectional positions illustrated in FIG. 6 to the thickness and number of basic ply blankets needed to create a wing skin of the type illustrated in FIG. 6 using the method of the invention; and, FIG. 11 is a vertically enlarged layup diagram illustrating the number of basic ply blankets needed to form the wing skin illustrated in FIG. 6 using the method of the invention so that the wing skin will have the thickness dimension set forth in the second column of the FIG. 7 table, based on the number of tows per foot set forth in the third column.

Preferably, after the plies are stacked, they are joined by Z-axis, i.e., cross-ply stitching. Such stitching is illustrated in FIG. 5 wherein the plies are shown in a spaced apart position so that the Z-axis stitches 29 can be seen. While the plies can be impregnated with resin prior to being stacked to form a basic ply blanket, more preferably, dry plies are stacked and the resin added after the basic ply blanket is formed. Most preferably, the number of dry basic ply blankets needed to create the desired composite are stacked and Z-axis stitched prior to the addition of resin. Dry ply and blanket stacking is preferred since it is substantially easier to Z-axis stitch dry layup stacks than it is to Z-axis stitch resin impregnated layup stacks. Preferably, resin is added to dry ply layup stacks and the combination cured using the method described in U.S. Patent Application Ser. No. 676,427, filed Nov. 29, 1984, entitled RESIN FILM INFUSION PROCESS referenced above.

Figure 6:
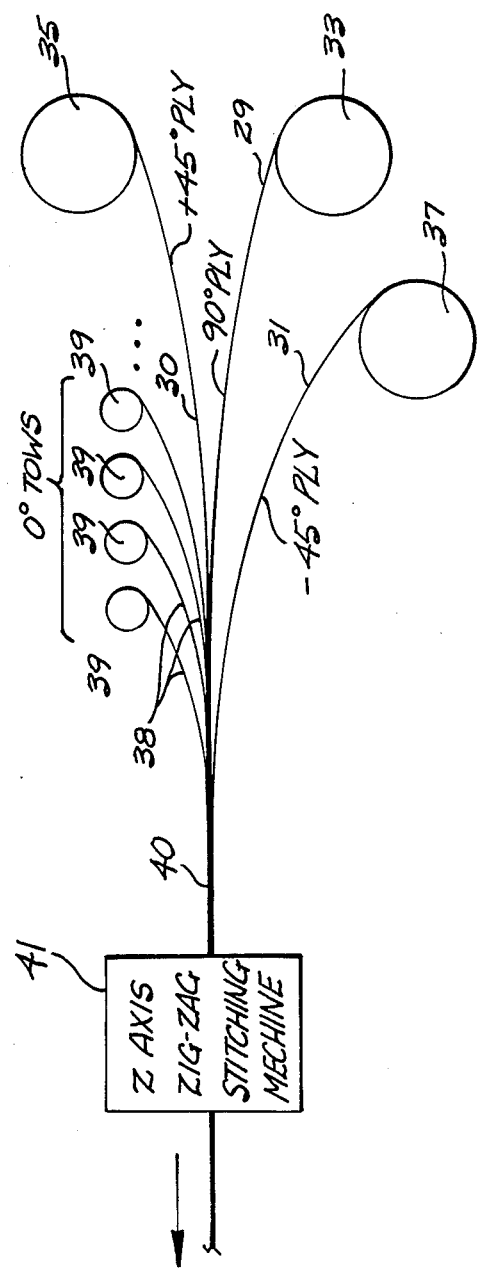
FIG. 6 schematically illustrates a machine for forming unwoven basic ply blankets of the type illustrated in FIGS. 3 and 4 and cross-stitching such blankets as shown in FIG. 5.

FIG. 6 is a schematic diagram of a machine suitable for creating basic ply blankets in accordance with the invention. For purposes of discussion, it is assumed that the 90°, +45° and −45° plies 29, 30 and 31 had their tows stitched together (such as in the manner illustrated in FIG. 2) prior to the plies being stacked to create a basic ply blanket 40. The stitched 90° ply 29 is shown in FIG. 6 forming a first roll 33, the stitched +45° ply 30 is shown forming a second roll 35 and the stitched −45° ply 31 is shown forming a third roll 37. The tows 38 to be used to form the 0° ply are shown rolled up on a plurality of bobbins 39. The bobbins are, of course, positioned such that the tows can be laid at the appropriate (e.g., 0°) angle with respect to the orientation of the fibers of the 90°, +45° and −45° plies. While shown as mounted on axially spaced-apart shafts so that they can be seen, more commonly the bobbins 39 will be mounted on a single shaft whose axis lies parallel to the axes on which the first, second and third rolls 33, 35 and 37 are mounted. While mounted on parallel shafts, the direction of the plies forming the rolls are, of course, appropriately oriented. Specifically, the tows of the 90° ply 29 lie orthogonal to the axis of the shaft on which the first roll is mounted and the tows of the +45° and −45° plies 30 and 31 lie at +45° and −45° angles with respect to the axes of the shafts on which the second and third rolls 35 and 37 are mounted.

In operation, the first layer of the basic ply blanket 40 is formed by withdrawing the −45° ply 31 from the third roll 37 and laying it atop a suitable support (not shown). The −45° ply is overlaid with the 90° ply withdrawn from the first roll 33. The +45° ply 30 is withdrawn from the second roll 35 and placed atop the 90° ply. Then the 0° tows 38 are withdrawn from the bobbins 39 along predetermined spaced apart axes, and laid atop the +45° ply. The resultant stack of −45° ply, a 90° ply, +45° ply and 0° tows is continuously formed and drawn through a Z-axis zig-zag stitching machine 41, which stitches the set of basic plies together in the manner illustrated in FIG. 5 to complete the creation of the basic ply blanket. More specifically, the Z-axis zig-zag stitching machine 41 stitches the plies together by passing thread through the stacked plies in the Z-axis direction, i.e., the direction orthogonal to the plane of the stacked plies, as illustrated in FIG. 5.

Figure 7:
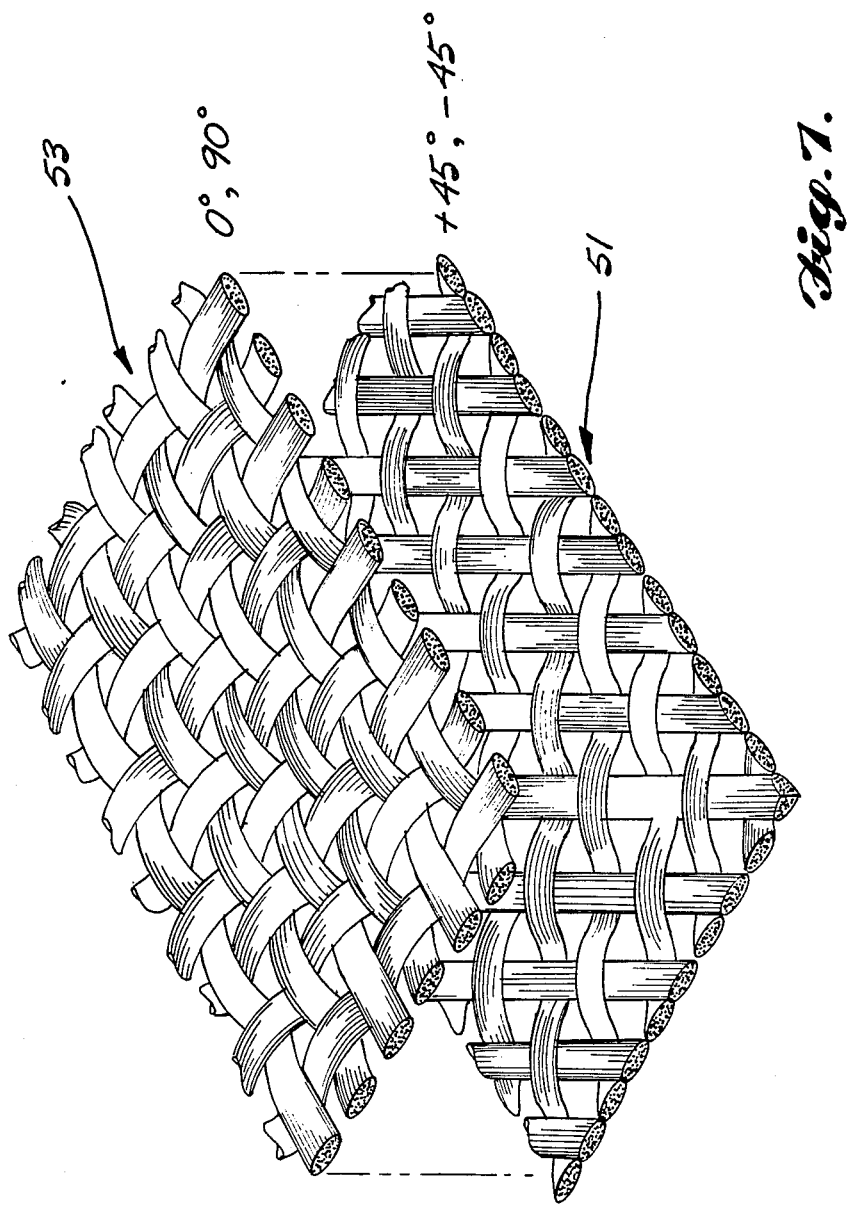
FIG. 7 is a pictorial diagram illustrating one way of forming a woven basic ply blanket in accordance with the invention.
Figure 8:
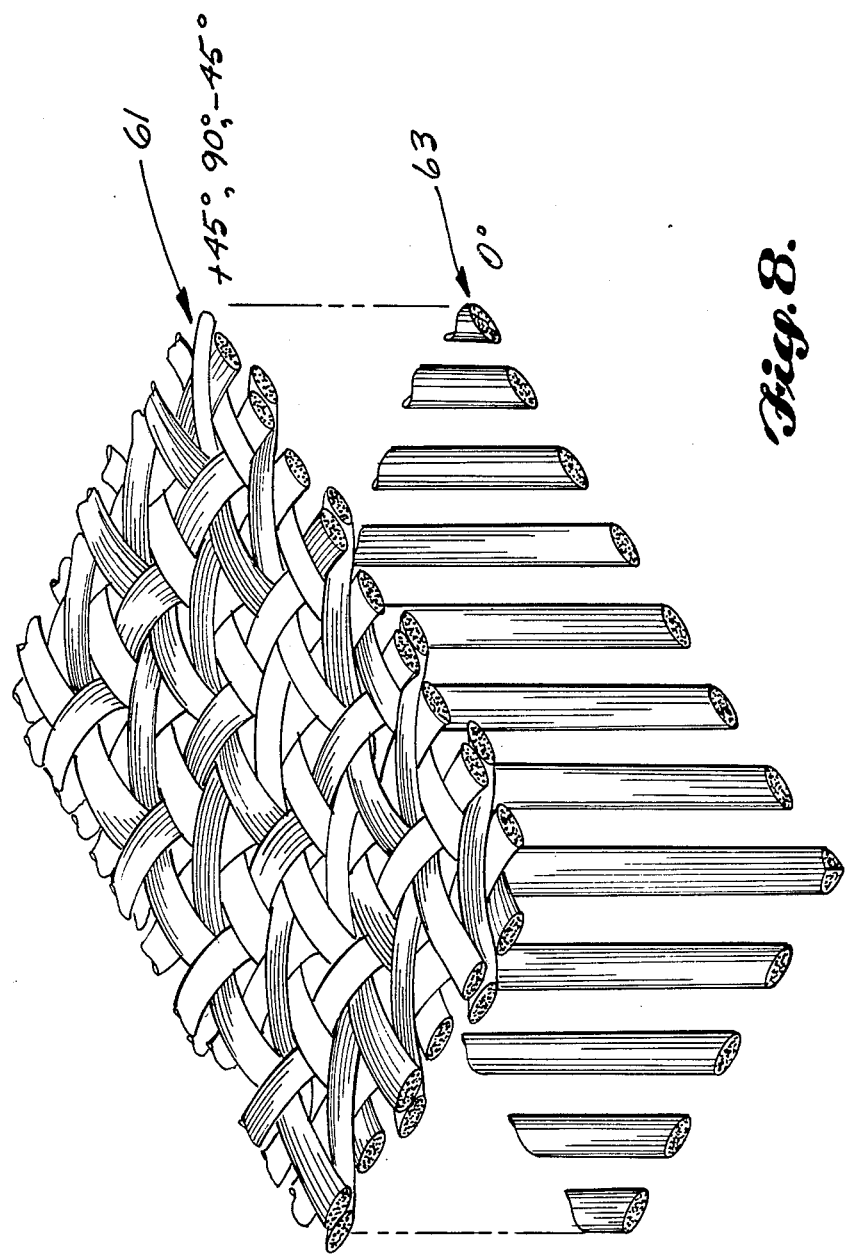
FIG. 8 is a pictorial diagram illustrating an alternative way of forming a woven basic ply blanket in accordance with the invention.

The heretofore described basic ply blankets have all been created from plies formed of tows laid side-by-side, i.e., parallel tows, which may or may not be stitched together by widely spaced apart basting stitches. While this method of creating basic ply blankets is preferred, if desired, basic ply blankets can also be formed from plies that are woven together, as illustrated in FIGS. 7 and 8. FIG. 7 illustrates a basic ply blanket formed of two biaxially woven plies 51 and 53. The first or lower ply 51 is formed of +45° and −45° tows orthogonally woven together. The second or upper ply 53 is formed of 0° and 90° tows orthogonally woven together. The biaxially woven plies are laid one atop the other and, if desired, joined by Z-axis stitching, as described above. While the first and second biaxially woven plies 51 and 53 are illustrated as formed of substantially equal number of tows in each direction, this is not to be taken as limiting. As with the ply arrangements illustrated in FIGS. 3 and 4 heretofore described, tow density in any direction is based on fiber areal weight, which, in turn, is based on the design criteria of the fiber reinforced resin composite to be created.

FIG. 8 illustrates a basic ply blanket formed of two plies—a triaxially woven ply 61 and a unidirectional ply 63. The upper or triaxially woven ply 61 is formed of +45°, 90° and −45° oriented tows. The lower or unidirectional ply 63 is formed of 0° oriented tows. If desired, after being layered, the unidirectional ply 63 can be attached to the triaxially woven ply by Z-axis stitching.

While not illustrated in the drawings, all four axis tows can be woven together, if desired. Or if tows running in more than four axial directions are required by the composite design criteria, the tows can be woven into a single woven ply or two (or more) woven ply layers, or one or more woven ply layers combined with one or more unidirectional layers. Hence, the weaving arrangements shown in FIGS. 7 and 8 should be construed as exemplary, not limiting.

As with the heretofore described nonwoven basic ply blankets formed in accordance with the invention, preferably, the woven plies that are stacked with other woven or unwoven plies to form basic ply blankets are dry and the basic ply blankets remain dry after being formed. As noted above, while dry plies are preferred, it is to be understood that resin preimpregnated plies can be used, if desired.

At this point, it will be appreciated that the invention provides a method of creating basic ply blankets. Each basic ply blanket includes at least one ply having fibers oriented in each of the directions established by the design criteria of the fiber reinforced resin composite to be formed. Preferably, the plies are formed of unidirectional tows with the parallel tows of one or more of the plies orthogonally stitched or in some other manner held together. Alternatively, the ply tows can be woven together to form one or more woven plies or layers. The woven or unwoven plies are stacked. After being stacked, preferably, the plies are joined by Z-axis stitching. While the thusly formed basic ply blankets may be impregnated with resin prior to several basic ply blankets being stacked in the manner hereinafter described, preferably, resin is added as the basic ply blankets are stacked. In this regard, preferably, resin is added in the manner described in U.S. Patent Application entitled RESIN FILM INFUSION PROCESS, Ser. No. 676,427, referenced more fully above.

Turning now to a detailed description of one method of determining the fiber content of the plies that are to be combined to form basic ply blankets and the method of determining the number of basic ply blankets to be stacked to create a fiber reinforced resin composite. In this regard, attention is directed to FIG. 9, which is a plan view of a wing skin 71 having a leading edge 73 and a trailing edge 75. The wing skin is cross-sectionally divided into twelve equal width sections. The wing tip end cross-section is designated A and the dividing planes between the sections moving inwardly from this wing tip are designated by the letters B through L. The letter M designates the inboard cross-section of the wing skin 51.

FIG. 10 is a table whose second column designates the design thickness of the wing skins at locations A through M, in inches. These figures are based on the load characteristics expected to be encountered by the wing when in use. For purposes of this discussion, it is assumed that the design fiber orientation is 6% 0° fibers, 44% +45° fibers, 44% −45° fibers and 6% 90° fibers. Since the development of thickness and percent fiber orientation design criteria do not form part of this invention, they are not described here. What is described is a method of producing a fiber reinforced resin composite that meets design thickness and percent fiber orientation design criteria without adding unnecessary material and, thus, unnecessary weight of the resultant fiber reinforced resin composite. In addition to the thickness values illustrated in FIG. 10 and percent fiber orientation noted above, it is assumed for purposes of this discussion, that the design criteria specifies Grade 145, AS-6 carbon fiber. As noted above, Grade 145, AS-6 carbon fiber has a thickness of 0.00565 inch per ply.

The first step of the method being described is to determine at least in relative terms the number of filaments needed to create the required composite thickness. This is accomplished by dividing the required thickness by the thickness per ply and multiplying the result by the known density (filament per inch value) of the chosen grade of fiber. In the case of this example this means dividing a wing thickness value at some arbitrarily chosen position by 0.00565 and multiplying the result by 84.7K filaments per inch. Doing this at wing position F produces a relative value of 3748K filaments per inch [(0.250 inch ÷0.00565 inch)×84.7K fil/inch]. Multiplying this value (3748K fil/inch) by 6% and 44% fiber orientation percentages results in approximate relative values of 225K fil/inch in the 0° and 90° directions and 1650K fil/inch in the +45° and −45° directions.

Carbon fiber is commonly produced in 1000 filament (1K), 3000 filament (3K), 6000 filament (6K) and 12,000 filament (12K) tows. The next step of the method is to use these tow values to determine, as close as practical, equal number of tows per inch in each fiber direction. This is accomplished by dividing the just determined fiber filament values by one of the commonly produced tow values. In the present example 3 and 12 are chosen for the 0°/90° and +45°/−45° directions, respectively. Dividing 225K fil/inch by 3 results in 75, 3K tows per inch in the 0° and 90° directions; and, dividing 1650K fil/inch by 12 results in 137.5, 12K tows per inch in the +45° and −45° directions. Since tows per foot is a more common figure used in the textile industry, these values are converted to 900, 3K tows per foot and 1650 12K tows per foot. Since a multiplicity of plies is desired the 900 and 1650 tow per foot values are reduced by a common factor to define the basic ply blanket. Dividing by 10, for example, results in 90, 3K tows per foot and 165 12K tows per foot. Plies having these values can be produced using modern textile techniques. (While other devisors, such as 8 or 9 could be utilized, a division value of 10 is the most appropriate in this example.)

In summary, at this point, all of the information needed to determine the content of each ply of a basic ply blanket has been determined. Specifically, the 6% plies, i.e., the 0° and 90° plies are to be formed of 3K tows spread out such that 90 tows occur in each planar cross-sectional ply foot. The 44% plies, i.e., the +45° and −45° plies are to be formed of 12K tows spread out such that 165 tows occur in each planar cross-sectional ply foot. In accordance with this information, woven or unwoven plies are created and stacked in the manner described above resulting in the formation of a basic ply blanket.

Next the number of basic ply blankets needed at each cross-sectional position to achieve the required design thickness is determined. This can be accomplished by measuring the thickness of the basic ply blanket. Alternatively, an acceptably close approximation of thickness can be made by summing the number of tows per foot of each ply and converting the results into filaments per inch. Since the basic ply blanket described above is formed of 90, 3K tows per foot in the 0° and 90° directions and 165, 12K tows per foot in the +45° and −45° directions this summation results in a total filament per foot value of 4500K. [(90×3K)+(165×12K)+(165×12K)+(90×3K)=4500K]. Dividing 4500K filaments per foot by 12 produces a value of 375K filament per inch. This value is next converted into a thickness value by multiplying the filaments per inch value by the thickness to filament ratio of the chosen grade of fiber. As noted above, the ply thickness of Grade 145, AS-6 carbon fiber is 0.00565 inches. The filament density is 84.7K filaments per inch. Thus, the thickness to filament ratio for Grade 145, AS-6 carbon fiber is 0.00565/84.7 (0.00565/84.7). Multiplying 375K filament per inch by this ratio determines that the thickness of each basic ply blanket is 0.0250 inch.

As will be found by applying the foregoing method to the thickness at cross-sectional positions other than the position chosen for the example (i.e., position F) the just determined basic ply blanket is not unique to the chosen position. Identical calculations made at any of the other positions produces substantially the same basic ply blanket values. For example, multiplying the thickness (0.051 inches) at position A by 84.7K filaments per inch and dividing the results by 0.00565 inches produces a relative value of 765K fil/inch at position A. Multiplying this value by the 6° and 44° design percentages produces relative values of 46K fil/inch in the 0° and 90° fiber directions and 337K fil/inch in the +45° and −45° directions. Using the previously chosen 3K and 12K tow values produces figures of 15, 3K tows per inch in the 0° and 90° fiber directions and 28, 12K tows per inch in the +45° and −45° fiber directions. These values convert to 180, 3K tows per foot in the 0° and 90° directions and 336, 12K tows per foot in the +45° and −45° directions. Dividing these values by 2 results in approximately the same planar ply values determined above—90, 3K tows per foot and 165 (actually 168), 12K tows per foot. Since the planar ply values are substantially the same, basic ply blanket thickness is the same.

Figure 9:
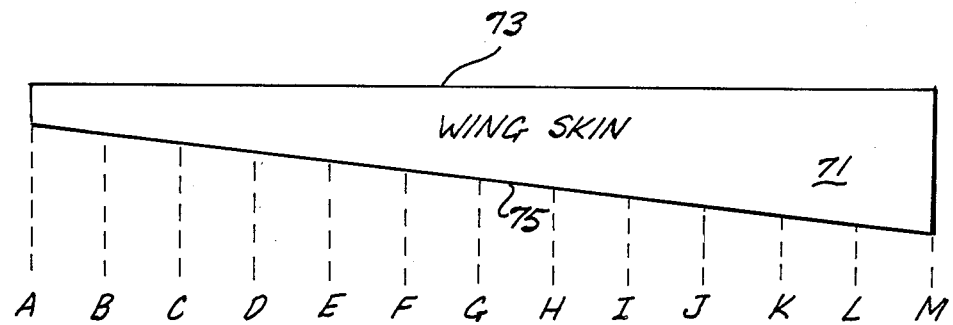
FIG. 9 is a plan diagram of a wing skin.

Once the dry thickness of the basic ply blanket to be used has been determined in the manner just described, the number of plies needed at each position is easily determined by dividing the design thickness by the thickness of a basic ply blanket. For the present example, this produces the values set forth in the third column of FIG. 10. Stacking the number of basic ply blankets listed in this column produces a wing skin having a cross sectional configuration of the type generally illustrated in FIG. 11. As will be readily understood by those skilled in the art when viewing FIG. 11, the vertical dimension of FIG. 11 has been proportionally increased so that the number and layout of basic ply blankets can be seen, i.e., FIG. 9 is not a proportional representation of the cross sectional configuration of a wing skin thickness resulting from the foregoing example.

In order to avoid large steps in the resultant composite, as illustrated in FIG. 11, preferably, when the number of basic ply blankets between wing positions increases by more than one, the distance between the positions is divided by the number of blankets to be added and the blankets are laid up such that one is added at each divisional position. See, for examples, the blankets added between positions B and C, I and J, J and K and K and L.

In the foregoing example, basic ply blankets were created using 3K and 12K tows per foot in the 0°/90° and +45°/−45° directions, respectively. The choice of 3K and 12K tows per foot is somewhat arbitrary, since other values could be used. For example, plies formed of 1K and 6K tows per foot in the 0°/90° and +45°/−45° directions, respectively, could have been chosen. Again using position F as an example, as before, a relative value of 3748K fil/inch is derived by dividing the thickness at position F (0.250 inches) by the cured thickness of a ply of Grade 145, AS-6 carbon fiber (0.00565 inches) and multiplying the results by 84.7K fil/inch. Also as before, when 3748K fil/inch is multiplied by the directional percentages in the 0°, 90°, +45° and −45° directions dictated by the design criteria, values of 225K fil/inch in the 0° and 90° directions and 1650K fil/inch in the +45° and −45° directions are determined. If 1K and 6K tows are chosen these density values result in values of 225, 1K tows per inch in the 0° and 90° directions and 275, 6K tows per inch in the + and −45° directions. These two values convert to 2700, 1K tows per foot in the 0° and 90° directions and 3300, 6K tows per foot in the +45° and −45° directions. Again, since a multiplicity of plies is desired the plies having 2700, 1K tows per foot and 3300, 6K tows per foot are divided by a common factor to define the basic ply blanket. Dividing these values by the number 20 created usable values, namely 135, 1K tows per foot in the 0° and 90° directions and 165, 6K tows per foot in the +45° and −45° directions. Applying the method described above, to determine the thickness of a basic ply blanket formed of plies having these tow and number of tow values, the ply values are summed to produce a total relative value of 2250K fil/inch, which reduces to 187.5K fil/inch. 187.5K fil/inch is equal to a basic ply blanket thickness of 0.0125 inches. When this value (0.0125 inches) is divided into the various thickness values for positions A through M, the basic ply blankets numbers set forth in the fourth column of FIG. 10 are produced.

As will be appreciated from reviewing the third and fourth columns of FIG. 10, a fiber reinforced resin composite formed of basic ply blankets of the type just described (i.e., basic ply blankets formed of 1K and 6K tows per foot plies) has substantially twice as many basic ply blankets as a composite formed of basic ply blankets created from the previously described 3K and 12K tows per foot plies. In some instances, composites built of 3K and 12K tows per foot basic ply blankets will have advantages over composites built of 1K and 6K tows per foot basic ply blankets and vice versa in other circumstances. For example, composite built of 1K and 6K tows per foot basic ply blankets have a more exact match to the theoretical thickness required. On the other hand, forming basic ply blankets from 1K and 6K tows per foot plies are more costly to produce than are basic ply blankets formed from 3K and 12K tows per foot plies. Hence, which basic ply blankets to choose in any particular set of circumstances depends on acceptable cost, efficiency and tow spacing tradeoffs.

The foregoing ways of implementing the method of the invention are based on (and thus limited by) current design techniques. An alternative and better way to implement the method of the invention is to reprogram the computers used to design fiber reinforced composites so that they provide filament requirements directly.

As will be readily appreciated from the foregoing description, the invention provides fiber reinforced resin composites formed of basic ply blankets that are formed of woven or unwoven plies. The basic ply blankets are formed so that the resulting composite has the fiber orientation prescribed by design criteria. Because unnecessary thickness and, thus, unnecessary weight is avoided, the invention has advantages over prior art fiber reinforced resin composites, particularly in fields where weight reduction without loss of strength is highly desirable. For example, unnecessary weight in an aircraft or space vehicle either reduces the payload that the vehicle can carry, and/or increases the fuel consumption of the vehicle.

While preferred embodiments of the invention have been illustrated and described, it will be appreciated that various changes can be made therein without departing from the spirit and scope of the invention. For example, as briefly noted above, rather than stitching tows together to create plies prior to layering the plies to create a basic ply blanket, individual tows can be laid down to form each ply, similar to the way the 0° tows are shown being laid down in FIG. 5. In addition, alternatively to stitching tows together, a thread coated with adhesive (i.e., sticky string) can be utilized to join the tows together. Hence, the invention can be practiced otherwise than as specifically described herein.

The embodiments of the invention in which an exclusive property or privilege is claimed are defined as follows:

1. A method of creating a fiber reinforced resin composite layup based on design criteria that specifies fiber orientation directions, fiber percentages in each fiber orientation direction and composite thickness at selected different locations, said method comprising the steps of:
   (a) creating a basic ply blanket from a plurality of plies formed of fiber filaments, one ply running in each of said fiber orientation directions, the percentage relationship of the magnitude of the fibers in said plies being the same as said design criteria;
   (b) determining the thickness of said basic ply blanket;
   (c) dividing the thickness of said basic ply blanket into the thickness of said composite at said selected different locations to determine the number of basic ply blankets needed to meet said design criteria thickness at said selected different locations; and,
   (d) stacking a plurality of basic ply blankets such that the number of said stacked basic ply blankets at each of said selected different location equals said number determined by dividing the thickness of said basic ply blanket into the design criteria thickness at said selected location, whereby the thickness of said stacked basic ply blankets equals said design criteria thickness at each of said selected different locations.

2. The method of creating a fiber reinforced resin composite layup as claimed in claim 1 wherein said fiber filaments that form said plurality of plies are arranged in unidirectional tows.

3. The method of creating a fiber reinforced resin composite layup as claimed in claim 2 wherein the tows forming at least one of said plies are joined by spaced-apart, transversely oriented joining means.

4. The method of creating a fiber reinforced resin composite layup as claimed in claim 3 wherein said joining means is a basting stitch.

5. The method of creating a fiber reinforced resin composite layup as claimed in claim 3 wherein said joining means is a thread coated with an adhesive.

6. The method of creating a fiber reinforced resin composite layup as claimed in claim 2 wherein said basic ply blanket is formed of at least two plies oriented in different directions and wherein the tows of said at least two plies are woven together.

7. The method of creating a fiber reinforced resin composite layup as claimed in claim 6 wherein said basic ply blanket is formed of at least three plies oriented in different directions and wherein the tows of said at least three plies are woven together.

8. The method of creating a fiber reinforced resin composite layup as claimed in claim 1 wherein said plurality of plies creating said basic ply blanket are stitched together in a direction transverse to the plane of said plies.

9. The method of creating a fiber reinforced resin composite layup as claimed in claim 8 wherein said fiber filaments that form said plurality of plies are arranged in unidirectional tows.

10. The method of creating a fiber reinforced resin composite layup as claimed in claim 9 wherein the tows forming at least one of said plies are joined by spaced-apart, transversely oriented joining means.

11. The method of creating a fiber reinforced resin composite layup as claimed in claim 10 wherein said joining means is a basting stitch.

12. The method of creating a fiber reinforced resin composite layup as claimed in claim 10 wherein said joining means is thread coated with an adhesive.

13. The method of creating a fiber reinforced resin composite layup as claimed in claim 9 wherein said basic ply blanket is formed of at least two plies oriented in different directions and wherein the tows of said at least two plies are woven together.

14. The method of creating a fiber reinforced resin composite layup as claimed in claim 13 wherein said basic ply blanket is formed of at least three plies oriented in different directions and wherein the tows of said at least three plies are woven together.

15. A method of creating a fiber reinforced resin composite layup as claimed in claim 1 wherein said plurality of basic ply blankets are stitched together in a direction transverse to the plane of said blankets.

16. The method of creating a fiber reinforced resin composite layup as claimed in claim 15 wherein said fiber filaments that form said plurality of plies are arranged in unidirectional tows.

17. The method of creating a fiber reinforced resin composite layup as claimed in claim 16 wherein the tows forming at least one of said plies are joined by spaced-apart, transversely oriented joining means.

18. The method of creating a fiber reinforced resin composite layup as claimed in claim 17 wherein said joining means is a basting stitch.

19. The method of creating a fiber reinforced resin composite layup as claimed in claim 17 wherein said joining means is a thread coated with an adhesive.

20. The method of creating a fiber reinforced resin composite layup as claimed in claim 16 wherein said basic ply blanket is formed of at least two plies oriented in different directions and wherein the tows of said at least two plies are woven together.

21. The method of creating a fiber reinforced resin composite layup as claimed in claim 20 wherein said basic ply blanket is formed of at least three plies oriented in different directions and wherein the tows of said at least three plies are woven together.

22. The method of creating a fiber reinforced resin composite layup as claimed in claim 15 wherein said plurality of plies creating said basic ply blanket are stitched together in a direction transverse to the plane of said plies.

23. The method of creating a fiber reinforced resin composite layup as claimed in claim 22 wherein said fiber filaments that form said plurality of plies are arranged in unidirectional tows.

24. The method of creating a fiber reinforced resin composite layup as claimed in claim 23 wherein the tows forming at least one of said plies are joined by spaced-apart, transversely oriented joining means.

25. The method of creating a fiber reinforced resin composite layup as claimed in claim 24 wherein said joining means is a basting stitch.

26. The method of creating a fiber reinforced resin composite layup as claimed in claim 24 wherein said joining means is a thread coated with an adhesive.

27. The method of creating a fiber reinforced resin composite layup as claimed in claim 23 wherein said basic ply blanket is formed of at least two plies oriented in different directions and wherein the tows of said at least two plies are woven together.

28. The method of creating a fiber reinforced resin composite layup as claimed in claim 27 wherein said basic ply blanket is formed of at least three plies oriented in different directions and wherein the tows of said at least three plies are woven together.

29. A fiber reinforced resin composite comprising a stack of identical basic ply blankets joined by a cured resin, each of said basic ply blankets formed of a plurality of plies each oriented in a different direction determined by the use to which said fiber reinforced resin is to be put, each of said plies formed of parallel oreinted fibers, the percentage relationship of the magnitude of the fiber filaments of said plies being the same as the design criteria percentage relationship determined by the user to which said fiber reinforced resin composite is to be put.

30. A fiber reinforced resin composite as claimed in claim 29 wherein said parallel oriented fibers that form said plurality of plies are arranged in unidirectional tows.

31. A fiber reinforced resin composite as claimed in claim 30 wherein the tows forming at least one of said plies are joined by spaced-apart, transversely oriented joining means.

32. A fiber reinforced resin composite as claimed in claim 31 wherein said joining means is a basting stitch.

33. A fiber reinforced resin composite as claimed in claim 31 wherein said joining means is a thread coated with an adhesive.

34. A fiber reinforced resin composite as claimed in claim 30 wherein said basic ply blanket is formed of at least two plies oriented in different directions and wherein the tows of said at least two plies are woven together.

35. A fiber reinforced resin composite as claimed in claim 34 wherein said basic ply blanket is formed of at least three plies oriented in different directions and wherein the tows of said at least three plies are woven together.

36. A fiber reinforced resin composite as claimed in claim 29 wherein said plurality of plies creating said basic ply blanket are stitched together in a direction transverse to the plane of said plies.

37. A fiber reinforced resin composite as claimed in claim 36 wherein said parallel oriented fibers that form said plurality of plies are arranged in unidirectional tows.

38. A fiber reinforced resin composite as claimed in claim 37 wherein the tows forming at least one of said plies are joined by spaced-apart, transversely oriented joining means.

39. A fiber reinforced resin composite as claimed in claim 38 wherein said joining means is a basting stitch.

40. A fiber reinforced resin composite as claimed in claim 38 wherein said joining means is a thread coated with an adhesive.

41. A fiber reinforced resin composite as claimed in claim 37 wherein said basic ply blanket is formed of at least two plies oriented in different directions and wherein the tows of said at least two plies are woven together.

42. A fiber reinforced resin composite as claimed in claim 41 wherein said basic ply blanket is formed of at least three plies oriented in different directions and wherein the tows of said at least three plies are woven together.

43. A fiber reinforced resin composite as claimed in claim 29 wherein said plurality of basic ply blankets are stitched together in a direction transverse to the plane of said blankets.

44. A fiber reinforced resin composite as claimed in claim 43 wherein said parallel oriented fibers that form said plurality of plies are arranged in unidirectional tows.

45. A fiber reinforced resin composite as claimed in claim 44 wherein the tows forming at least one of said plies are joined by spaced-apart, transversely oriented joining means.

46. A fiber reinforced resin composite as claimed in claim 45 wherein said joining means is a basting stitch.

47. A fiber reinforced resin composite as claimed in claim 45 wherein said joining means is a thread coated with an adhesive.

48. A fiber reinforced resin composite as claimed in claim 44 wherein said basic ply blanket is formed of at least two plies oriented in different directions and wherein the tows of said at least two plies are woven together.

49. A fiber reinforced resin composite as claimed in claim 48 wherein said basic ply blanket is formed of at least three plies oriented in different directions and wherein the tows of said at least three plies are woven together.

50. A fiber reinforced resin composite as claimed in claim 43 wherein said plurality of plies creating said basic ply blanket are stitched together in a direction transverse to the plane of said plies.

51. A fiber reinforced resin composite as claimed in claim 50 wherein said parallel oriented fibers that form said plurality of plies are arranged in unidirectional tows.

52. A fiber reinforced resin composite as claimed in claim 51 wherein the tows forming at least one of said plies are joined by spaced-apart, transversely oriented joining means.

53. A fiber reinforced resin composite as claimed in claim 52 wherein said joining means is a basting stitch.

54. A fiber reinforced resin composite as claimed in claim 52 wherein said joining means is a thread coated with an adhesive.

55. A fiber reinforced resin composite as claimed in claim 51 wherein said basic ply blanket is formed of at least two plies oriented in different directions and wherein the tows of said at least two plies are woven together.

56. A fiber reinforced resin composite as claimed in claim 55 wherein said basic ply blanket is formed of at least three plies oriented in different directions and wherein the tows of said at least three plies are woven together.

* * * * *